United States Patent
Jiang

(10) Patent No.: US 12,167,380 B2
(45) Date of Patent: Dec. 10, 2024

(54) BWP SWITCHING METHOD AND DEVICE, AND STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 610 days.

(21) Appl. No.: 17/125,417

(22) Filed: Dec. 17, 2020

(65) Prior Publication Data

US 2021/0105776 A1 Apr. 8, 2021

Related U.S. Application Data

(63) Continuation of application No. PCT/CN2018/092843, filed on Jun. 26, 2018.

(51) Int. Cl.
*H04W 72/20* (2023.01)
*H04W 72/0453* (2023.01)
*H04W 72/23* (2023.01)

(52) U.S. Cl.
CPC ....... *H04W 72/0453* (2013.01); *H04W 72/20* (2023.01); *H04W 72/23* (2023.01)

(58) Field of Classification Search
CPC . H04W 72/0453; H04W 72/23; H04W 36/06; H04W 36/18; H04W 74/0833; H04W 72/52; H04W 72/20; H04W 48/12; H04W 76/27; H04L 5/0008; H04L 5/0055; H04L 5/0098
See application file for complete search history.

(56) References Cited

U.S. PATENT DOCUMENTS

| | | | |
|---|---|---|---|
| 2019/0103954 A1* | 4/2019 | Lee | H04L 5/0098 |
| 2019/0253230 A1* | 8/2019 | Loehr | H04W 72/23 |
| 2019/0260530 A1 | 8/2019 | Yi et al. | |
| 2019/0335508 A1* | 10/2019 | Agiwal | H04W 48/14 |

(Continued)

FOREIGN PATENT DOCUMENTS

| | | |
|---|---|---|
| CN | 108012329 A | 5/2018 |
| CN | 108135028 A | 6/2018 |

(Continued)

OTHER PUBLICATIONS

International Search Report issued in International Application No. PCT/CN2018/092843 mailed Feb. 3, 2019. (with English translation) (5 pages).

(Continued)

*Primary Examiner* — Thai Nguyen
(74) *Attorney, Agent, or Firm* — Oblon, McClelland, Maier & Neustadt, L.L.P.

(57) ABSTRACT

The present disclosure relates to a BWP switching method and device, and a storage medium. The BWP switching method applied to a terminal and can include that, after determining that a terminal is to perform BWP switching, keeping a first BWP currently activated on a carrier to be in an activated state. The method can further include activating a second BWP on the carrier, and controlling the first BWP to be in an inactivated state. The present disclosure enables a terminal to normally process a service of a high priority during BWP switching and after BWP switching is performed.

12 Claims, 22 Drawing Sheets

(56) References Cited

U.S. PATENT DOCUMENTS

| | | | |
|---|---|---|---|
| 2019/0394710 A1* | 12/2019 | Ugurlu | H04W 8/24 |
| 2020/0029318 A1* | 1/2020 | Guo | H04L 1/1822 |
| 2020/0359362 A1 | 11/2020 | Yi et al. | |
| 2021/0119745 A1 | 4/2021 | Li et al. | |
| 2021/0352623 A1* | 11/2021 | Wang | H04W 72/0446 |

FOREIGN PATENT DOCUMENTS

| | | | | |
|---|---|---|---|---|
| EP | 3506713 A1 * | 7/2019 | | H04L 5/0051 |
| EP | 3528538 A1 * | 8/2019 | | H04W 36/0016 |
| EP | 3 817 480 A1 | 5/2021 | | |
| IN | 202017027591 A | 6/2021 | | |
| WO | WO 2018/084571 A1 | 5/2018 | | |

OTHER PUBLICATIONS

Written Opinion of the International Searching Authority issued in International Application No. PCT/CN2018/092843 mailed Feb. 3, 2019 (3 pages).

Combined Chinese Office Action and Search Report issued May 7, 2021 in Chinese Patent Application No. 201880000929.0 (with English translation), 12 pages.

"Multiple Active Bandwidth Parts" Samsung, 3GPP TSG-RAN WG2 NR #102 Meeting R2-1808650, Busan, Korea, May 21-25, 2018, 2 pages.

3GPP TSG RAN WGl Meeting AH 1801, RI-1800647, Institute for Information Industry (III), "RACH procedure with BWP", Jan. 2018, 6 total pages.

3GPP TSG RAN WGl NR Ad-Hoc Meeting, RI-1711424, Huawei, HiSilicon, "On bandwidth adaptation", Jun. 2017, 5 total pages.

Extended European Search Report issued Dec. 21, 2021in European Patent Application No. 18923916.3, 12 pages.

Indian Office Action issued Jan. 10, 2022 in Indian Patent Application No. 202147000643, 8 pages.

Intel Corporation, "Open issues for wider bandwidth operations," 3GPP TSG RAN WG1 NR Ad-Hoc#2 R1-1710583, XP051299790, Jun. 2017, 7 pages.

Vivo, "Clarification on the RACH re-initiation after BWP switching," 3GPP TSG-RAN WG2 Meeting #101bis R2-1804690, XP051428404, Apr. 2018, 4 pages.

Indian Hearing Notice issued Aug. 2, 2023 in Indian Application No. 202147000643 (with English translation), 3 pages.

\* cited by examiner

BWP SWITCHING METHOD AND DEVICE, AND STORAGE MEDIUM

CROSS-REFERENCE TO RELATED APPLICATIONS

This application is a continuation of International Application No. PCT/CN2018/092843 filed on Jun. 26, 2018, the content of which is incorporated herein by reference in its entirety.

TECHNICAL FIELD

The present disclosure generally relates to the technical field of communications, including to a band width part (BWP) switching method and device, and a storage medium.

BACKGROUND

When user equipment (UE) needs to report a buffer status report, but there is no available uplink (UL) resource or a UL resource does not meet a logical channel prioritization (LCP) constraint, if a scheduling request (SR) resource is configured for the UE, the UE sends an SR to request for a UL resource. Further, if no SR resource is configured for the UE, the UE initiates random access to apply for the UL resource.

In a new radio (NR) system, a carrier bandwidth may be divided into multiple BWPs, multiple BWPs may be configured for a piece of UE at the same time, but only one BWP is activated for a piece of UE on a carrier at the same time. If multiple carriers are configured for UE, there is one activated BWP on each carrier. For a paired spectrum including a UL carrier and a downlink (DL) carrier, for example, frequency division duplexing (FDD), a UL BWP and a DL BWP are independently configured. For an unpaired spectrum including a UL carrier and a DL carrier, for example, time division duplexing (TDD), a UL BWP and a DL BWP are the same BWP.

A network may instruct UE for BWP switching, and the UE may also independently trigger the BWP switching. For example, for random access triggered by an SR, when there is no physical random access channel (PRACH) resource on a present BWP, the UE may trigger switching to an initial BWP. For another example, for random access triggered by beam failure recovery (BFR), when there is no PRACH resource on the present BWP, the UE may trigger switching to the initial BWP.

Taking the random access triggered by the SR as an example, according to a present protocol, after the UE triggers the SR, if there is no physical uplink control channel (PUCCH) resource for sending the SR on an activated BWP, the UE triggers a random access flow. If there is no PRACH resource on an activated BWP in a special cell (SpCell), the UE is switched to an initial BWP in the SpCell to initiate the random access flow. Under a normal condition, no SR resource and PRACH resource may be configured for a low-priority service such as enhance mobile broadband (eMBB) on an activated BWP, while an SR resource or a configured UL grant resource may usually be configured for a high-priority service such as ultra reliable & low latency communication (URLLC) on the activated BWP. Therefore, BWP switching, for example, switching to an initial BWP, is more likely to be performed for the low-priority service because random access is triggered. However, there may be no SR resource/configured UL grant resource configured for the URLLC service on the initial BWP, and consequently, the URLLC service may not work normally on the initial BWP because it is difficult to ensure a delay. On the other hand, a certain delay exists for the BWP switching, and in this period of time, UE may not send or receive data, so normal execution of the URLLC service may also be influenced.

SUMMARY

According to a first aspect of the present disclosure, a BWP switching method is provided, which may be applied to a terminal. The method can include that, after determining that the terminal needs to perform BWP switching, a first BWP that is presently activated on a carrier is kept in an active state, a second BWP on the carrier is activated, and the first BWP is controlled to be in an inactive state.

According to a second aspect of the present disclosure, a BWP switching method is provided, which may be applied to a base station. The method can include that a message sent by a terminal on a second BWP is received, the second BWP being a BWP, activated responsive to that the terminal performs BWP switching, on a carrier. Further, the method can include that an instruction message is sent to the terminal, the instruction message being configured to instruct the terminal to control a first BWP to be in an inactive state. The first BWP may be a BWP, activated before the terminal performs the BWP switching, on the carrier.

According to a third aspect of the present disclosure, a BWP switching device is provided which may be applied to a terminal. The device can include a processor and a memory for storing instructions executable by the processor. Further, the processor can be configured to execute the BWP switching method in the first aspect.

According to a fourth aspect of the present disclosure, a BWP switching device is provided which may be applied to a base station and include a processor and a memory for storing instructions executable by the processor. Additionally, the processor can be configured to execute the BWP switching method in the second aspect.

It is to be understood that the above general descriptions and detailed descriptions below are only exemplary and explanatory, and not intended to limit the present disclosure.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
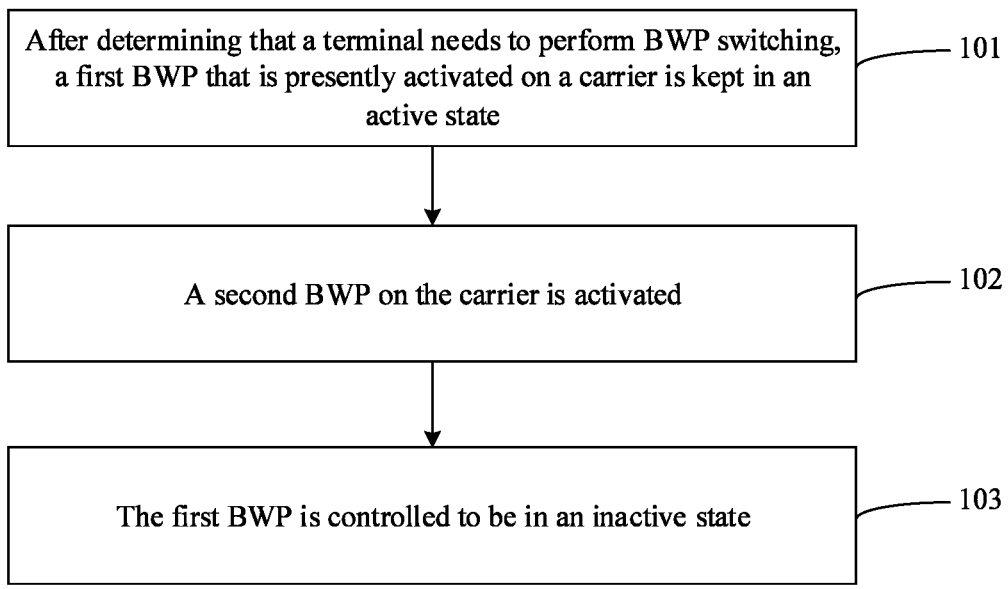
FIG. 1 is a flow chart showing a BWP switching method, according to an exemplary embodiment.

FIG. 1 is a flow chart showing a BWP switching method, according to an exemplary embodiment. The method may be applied to a terminal. As illustrated in FIG. 1, the method includes the following steps.

In step 101, after determining that the terminal needs to perform BWP switching, a first BWP that is presently activated on a carrier is kept in an active state. When a BWP is in the active state, the terminal may receive and/or send data on the BWP.

In step 102, a second BWP on the carrier is activated. In an implementable mode, the second BWP is a BWP that is on the same carrier with the first BWP and in an inactive state, and after the second BWP is activated, the second BWP is in the active state.

In an implementable mode, if the terminal needs to perform the BWP switching because the terminal triggers random access but there is no PRACH resource on a presently activated BWP in an SpCell, the terminal keeps the first BWP in the active state and activates the second BWP. The second BWP may be an initial BWP in the SpCell. The terminal may be switched to the initial BWP to initiate random access and send a random access preamble on the initial BWP.

In another implementable mode, if the terminal needs to perform the BWP switching because the terminal needs to send an SR but there is no resource for sending the SR on a presently activated BWP on the carrier, the terminal needs to be switched to a BWP with the resource for sending the SR, for example, switched to the second BWP to send the SR, so that the terminal may keep the presently activated BWP on the carrier, activate the second BWP and send the SR on the second BWP.

In step 103, the first BWP is controlled to be in an inactive state. When the first BWP is controlled to be in the inactive state, the terminal may switch the first BWP from the active state to the inactive state, namely the first BWP is deactivated. When a BWP is in the inactive state, the terminal may not send or receive data on the BWP.

According to the BWP switching method of the embodiment, a BWP originally in the active state on a carrier is kept in the active state at the same time when a new BWP on the carrier is activated, so that the problem that a high-priority service may not be processed on a new BWP after switching due to the fact that there is no resource required by processing of the high-priority service such as a URLLC service on the new BWP after switching is solved, and UE may normally process the high-priority service when performing the BWP switching or after performing the BWP switching.

Figure 2:
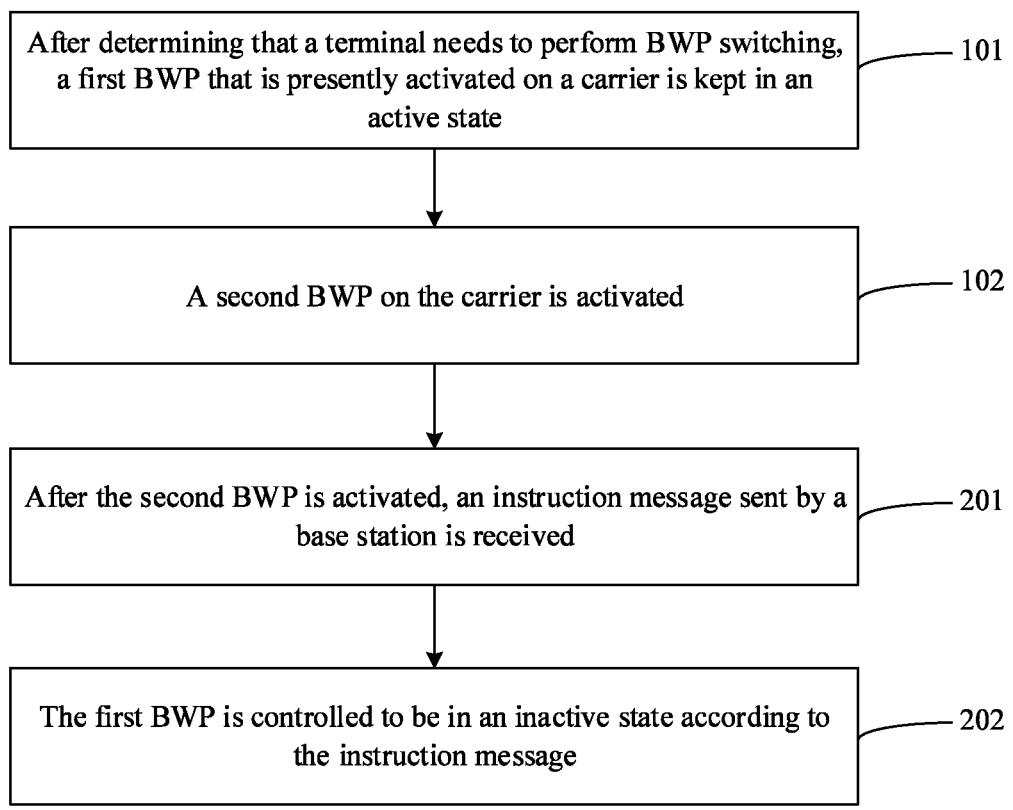
FIG. 2 is a flow chart showing a BWP switching method, according to an exemplary embodiment.

FIG. 2 is a flow chart showing a BWP switching method, according to an exemplary embodiment. As illustrated in FIG. 2, in the method, the step that the first BWP is controlled to be in the inactive state may include the following steps. In step 201, after the second BWP is activated, an instruction message sent by a base station is received. In step 202, the first BWP is controlled to be in the inactive state according to the instruction message. For example, the base station may send the instruction message to the terminal through a PDCCH, a medium/media access control (MAC) control element (CE) or RRC. The terminal deactivates the first BWP based on the received instruction message of the base station, so that the problem that the terminal, when sending a message on one BWP, may not simultaneously send a message on the other BWP due to the fact that the two BWPs in the active state coexist on the same carrier may be effectively solved.

In an implementable mode, the instruction message sent to the terminal by the base station may include at least one of: an instruction message configured to instruct the terminal to activate the second BWP, an instruction message configured to instruct the terminal to control the first BWP to be in the inactive state, an instruction message configured to instruct the terminal to be switched from the second BWP to a third BWP on the carrier, or an instruction message including an RRC reconfiguration. The terminal, when receiving at least one instruction message in these instruction messages, may execute an operation of switching the first BWP to the inactive state to achieve a purpose of timely deactivating the BWP.

Figure 3:
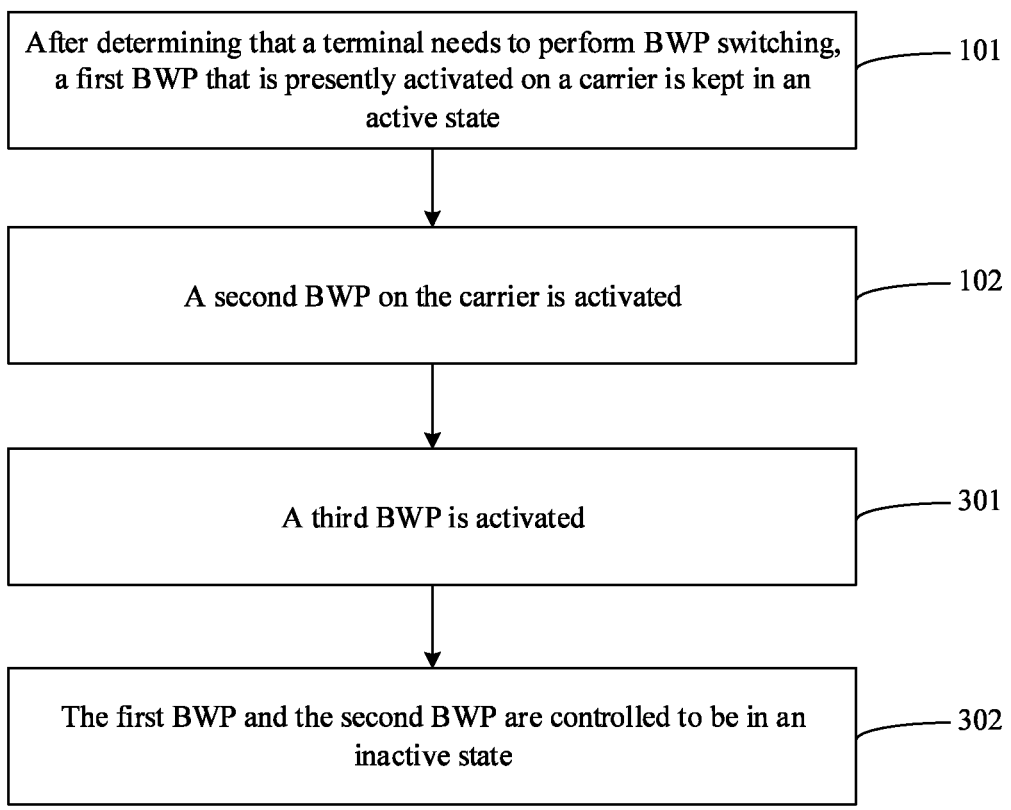
FIG. 3 is a flow chart showing a BWP switching method, according to an exemplary embodiment.

In an implementable mode, the instruction message may be configured to instruct the terminal to be switched from the second BWP to the third BWP on the carrier, and the instruction message may be sent to the terminal by the base station, namely the base station, under the condition that the terminal is switched from the first BWP to the second BWP and keeps the first BWP in the active state, may control the terminal to deactivate the first BWP and the second BWP and activate the third BWP. FIG. 3 is a flow chart showing a BWP switching method, according to an exemplary embodiment. As illustrated in FIG. 3, in the method, the operation that the first BWP is controlled to be in the inactive state according to the instruction message may include the following steps. In step 301, the third BWP is activated. In step 302, the first BWP and the second BWP are controlled to be in the inactive state. The third BWP may be a different BWP on the same carrier with the first BWP and the second BWP.

Figure 4:
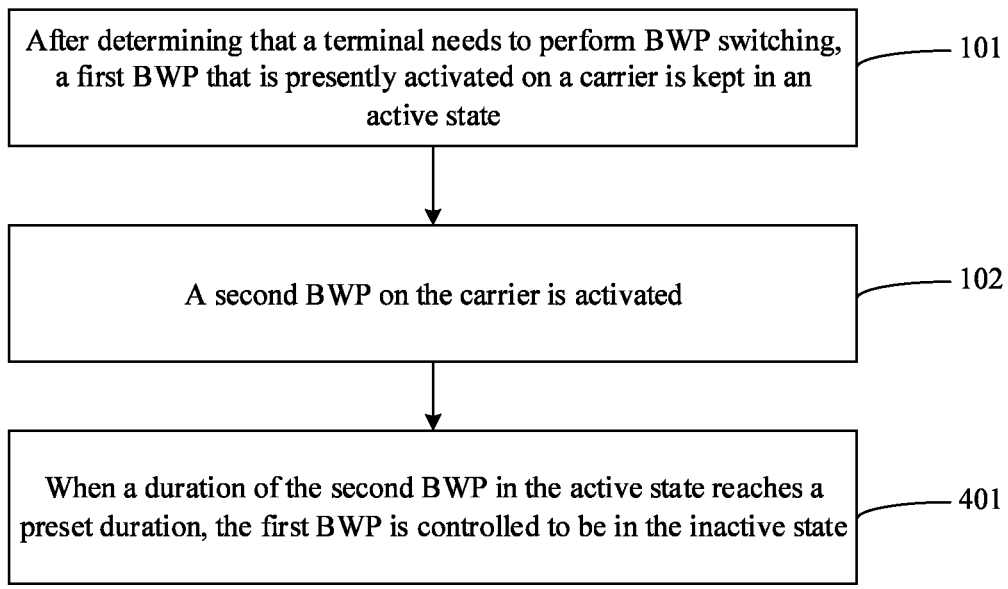
FIG. 4 is a flow chart showing a BWP switching method, according to an exemplary embodiment.

FIG. 4 is a flow chart showing a BWP switching method, according to an exemplary embodiment. As illustrated in FIG. 4, in the method of the embodiment, the operation that the first BWP is controlled to be in the inactive state may include the following step. In step 401, when a duration of the second BWP in the active state reaches a preset duration, the first BWP is controlled to be in the inactive state. Here, the terminal may judge whether the duration of the second BWP in the active state reaches the preset duration. The preset duration may be configured for the terminal by the base station or predetermined by the base station and the terminal. Deactivating the first BWP after the second BWP is kept active for the preset duration may solve the problem of a message sending conflict of the terminal because of coexistence of two BWPs in the active state on the same carrier.

Figure 5:
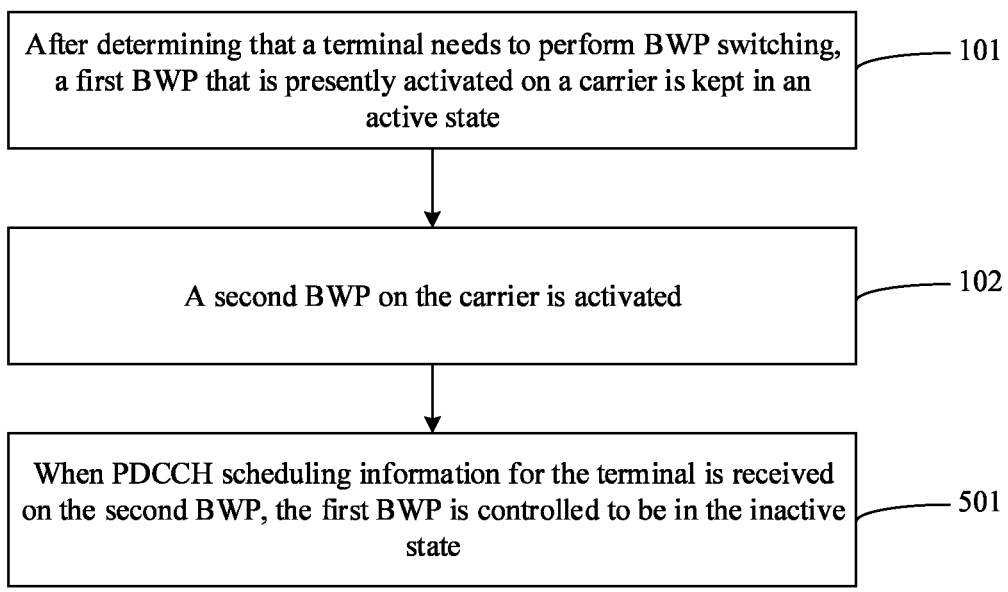
FIG. 5 is a flow chart showing a BWP switching method, according to an exemplary embodiment.

FIG. 5 is a flow chart showing a BWP switching method, according to an exemplary embodiment. As illustrated in FIG. 5, in the method of the embodiment, the operation that the first BWP is controlled to be in the inactive state may include the following step. In step 501, when PDCCH scheduling information for the terminal is received on the second BWP, the first BWP is controlled to be in the inactive state. When the base station receives the PDCCH scheduling information for the terminal on the second BWP, it is indicated that the base station has successfully recognize the terminal on the second BWP, and in such case, the first BWP may be deactivated. The PDCCH scheduling information for the terminal is, for example, PDCCH scheduling information for an identifier of the terminal, and the identifier of the terminal may be a cell-radio network temporary identifier (C-RNTI). The PDCCH scheduling information may include a DL assignment and a UL grant. In the method of the embodiment, before BWP switching, a presently activated BWP1 on the carrier is kept in the active state and another BWP2 on the carrier is activated, and after a resource on the newly activated BWP1 is prepared, the activated BWP2 is deactivated, so that the influence of the BWP switching on a high-priority service such as URLLC may be reduced.

Figure 6:
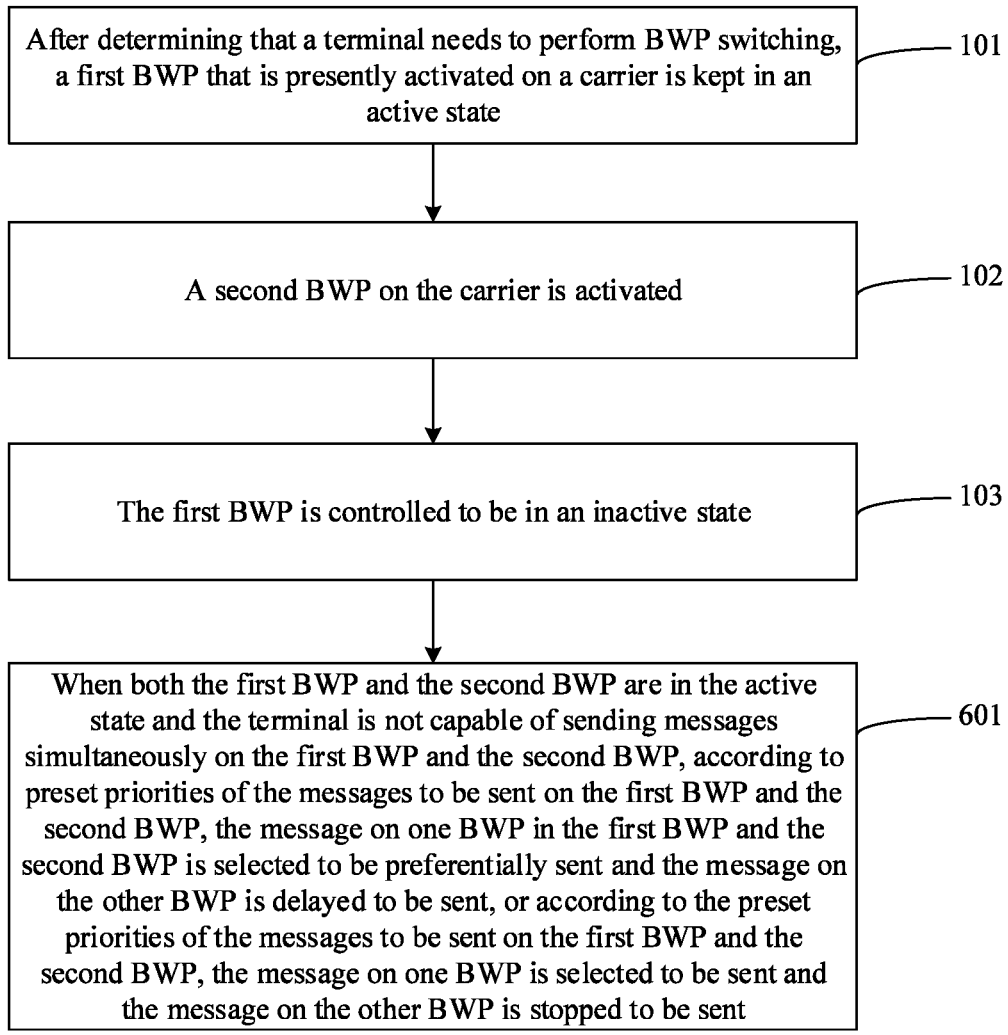
FIG. 6 is a flow chart showing a BWP switching method, according to an exemplary embodiment.

FIG. 6 is a flow chart showing a BWP switching method, according to an exemplary embodiment. As illustrated in FIG. 6, based on the method illustrated in FIG. 1, the method of the embodiment may further include the following step. In step 601, when both the first BWP and the second BWP are in the active state and the terminal is not capable of sending messages simultaneously on the first BWP and the second BWP, according to preset priorities of the messages to be sent on the first BWP and the second BWP, the message on one BWP in the first BWP and the second BWP is selected to be preferentially sent and the message on the other BWP is delayed to be sent, or according to the preset priorities of the messages to be sent on the first BWP and the second BWP, the message on one BWP is selected to be sent and the message on the other BWP is stopped to be sent. The preset priority may be configured for the terminal by the base station and may also be predetermined by the base station and the terminal.

For example, when the terminal sends a preamble, an SR, a physical uplink shared channel (PUSCH) message, a PUCCH message or a sounding reference signal (SRS) on one BWP, these messages may not be simultaneously sent on another BWP, and consequently, there may be a conflict. If a priority of the preamble or SR to be sent on one BWP is lower than a priority of the message to be sent on another BWP, the preamble or the SR may be delayed to be sent and the message on the other BWP is preferentially sent, or the message with a lower priority may be selected not to be sent in a PRACH occasion/SR occasion overlapping the message with a higher priority in a time domain. Or, if a priority of the PUSCH/SRS/PUCCH message on one BWP is lower than the priority of the message on the other BWP, these messages may be discarded and the message on the other BWP is sent.

Figure 7:
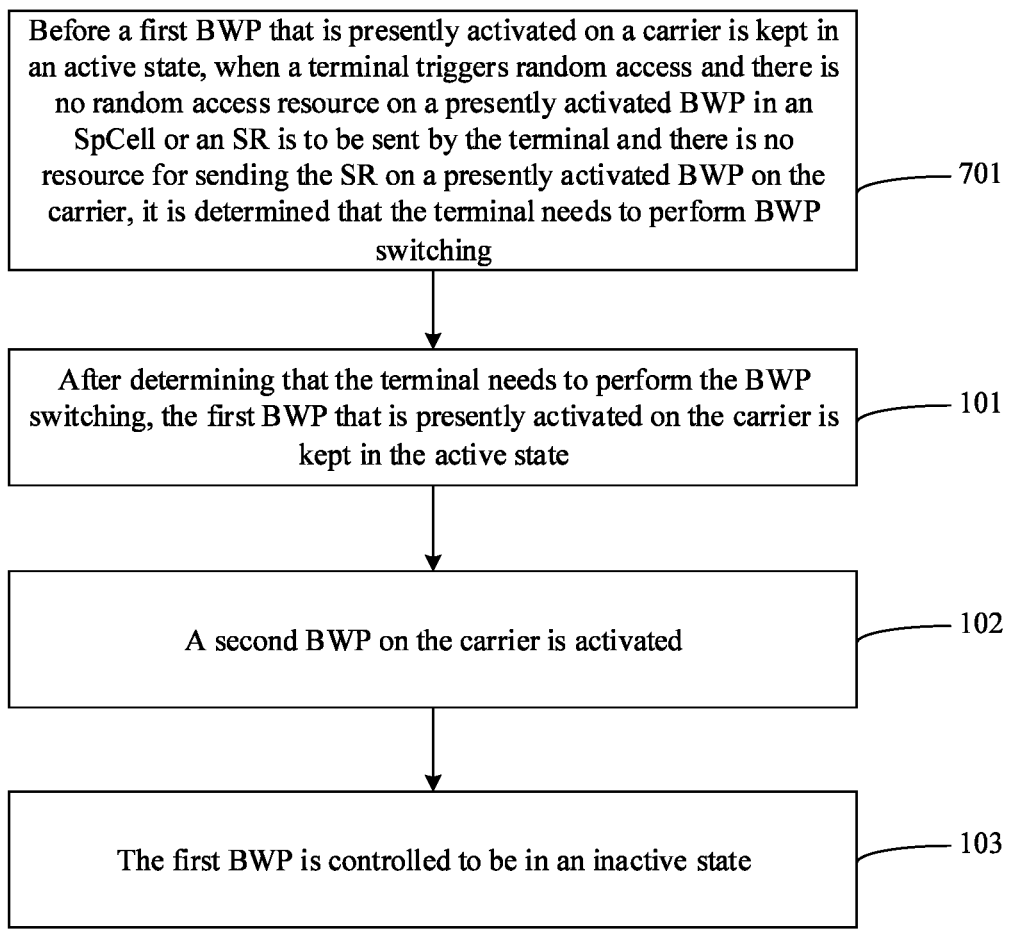
FIG. 7 is a flow chart showing a BWP switching method, according to an exemplary embodiment.

FIG. 7 is a flow chart showing a BWP switching method, according to an exemplary embodiment. As illustrated in FIG. 7, based on the method illustrated in FIG. 1, the method may further include the following step. In step 701, before the first BWP that is presently activated on the carrier is kept in the active state, when the terminal triggers random access and there is no random access resource on a presently activated BWP (for example, the first BWP) in an SpCell or an SR is to be sent by the terminal and there is no resource for sending the SR on a presently activated BWP (for example, the first BWP) on the carrier, it is determined that the terminal needs to perform the BWP switching.

The condition that the terminal triggers random access and there is no random access resource on the presently activated BWP in the SpCell may include: the UE needs to send a system information (SI) request and thus triggers random access but there is no PRACH resource on the presently activated BWP in the SpCell, or random access is triggered by BFR but there is no PRACH resource on the presently activated BWP in the SpCell, or the UE needs to send an SR but there is no resource for sending the SR on the presently activated BWP in the SpCell.

In an implementable mode, the random access triggered by the terminal may be contention-based random access. When the terminal initiates contention-based random access, since a PRACH resource for random access may be independently configured on each BWP, the condition that there is no PRACH resource on the presently activated BWP in the SpCell may exist, and in such case, the UE needs to be switched to the initial BWP in the SpCell for random access. When the terminal needs to perform the BWP switching because the terminal triggers random access and there is no random access resource on the presently activated BWP in the SpCell, the first BWP is the presently activated BWP in the SpCell, and the second BWP is the initial BWP in the SpCell.

Figure 8:
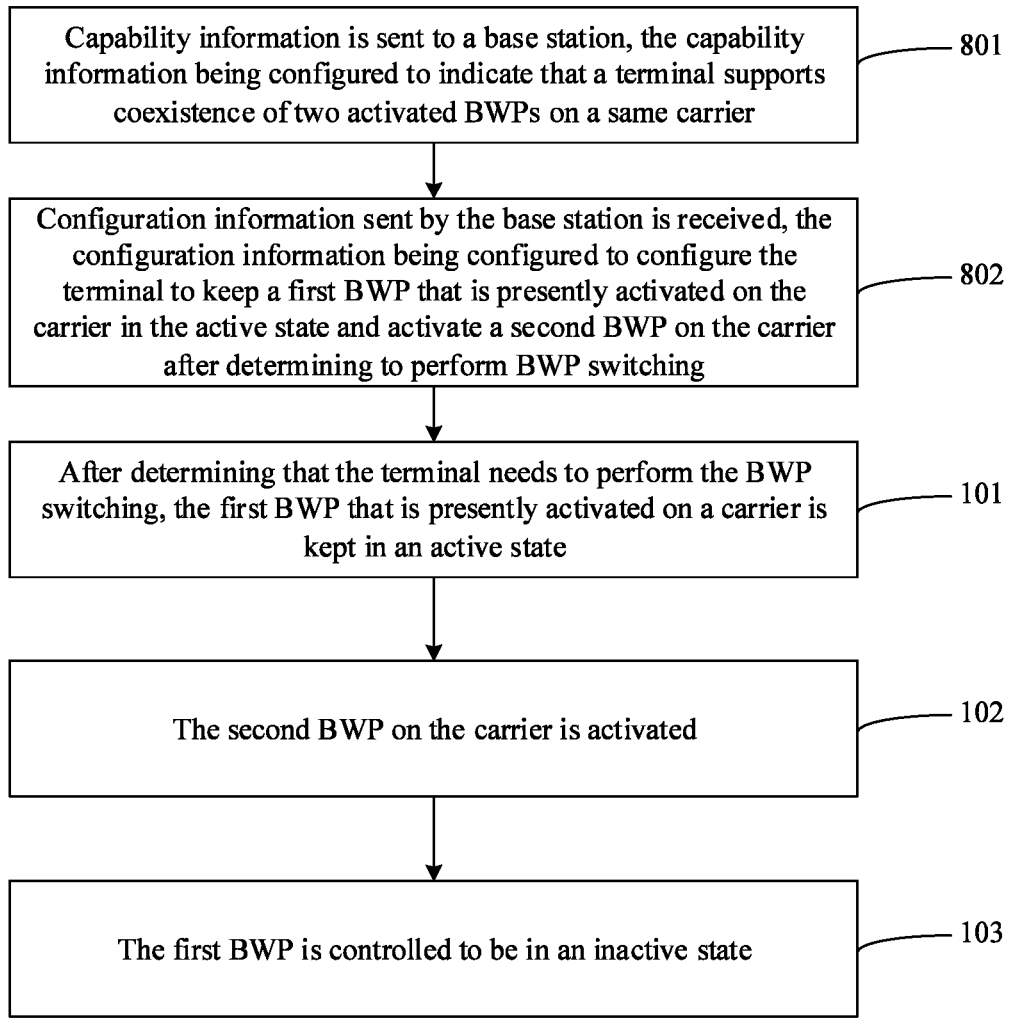
FIG. 8 is a flow chart showing a BWP switching method, according to an exemplary embodiment.

FIG. 8 is a flow chart showing a BWP switching method, according to an exemplary embodiment. As illustrated in FIG. 8, based on the method illustrated in FIG. 1, the method may further include the following steps. In step 801, capability information is sent to the base station, and the capability information is configured to indicate that the terminal supports coexistence of two activated BWPs on a same carrier. In step 802, configuration information sent by the base station is received, and the configuration information is configured to configure the terminal to keep the first BWP that is presently activated on the carrier in the active state and activate the second BWP on the carrier after determining to perform the BWP switching. That is, whether the terminal may keep two BWPs in the active state on the same carrier may be configured by the base station, and after the base station pre-configures this function of the terminal to be on, the terminal, when determining that the BWP switching needs, may execute the operation of keeping the first BWP on the carrier in the active state and activating the second BWP on the carrier.

Figure 9:
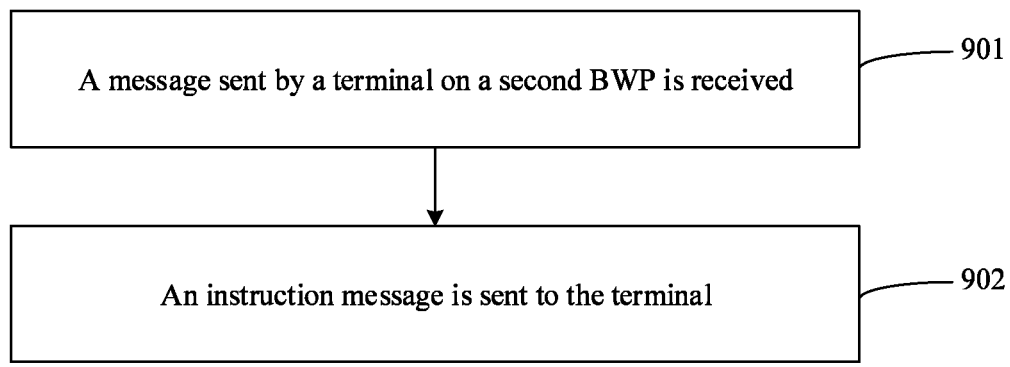
FIG. 9 is a flow chart showing a BWP switching method, according to an exemplary embodiment.

FIG. 9 is a flow chart showing a BWP switching method, according to an exemplary embodiment. The method is applied to a base station. As illustrated in FIG. 9, the method includes the following steps.

In step 901, a message sent by a terminal on a second BWP is received, the second BWP being a BWP, activated when the terminal performs BWP switching, on a carrier. In an implementable mode, when the terminal sending the message on the second BWP sends the message, both a first BWP and the second BWP on the same carrier may be in an active state.

In step 902, an instruction message is sent to the terminal, the instruction message being configured to instruct the terminal to control a first BWP to be in an inactive state. The first BWP is a BWP, activated before the terminal performs the BWP switching, on the carrier.

According to the BWP switching method of the embodiment, when the message sent by the terminal on the second BWP is received, the terminal is instructed to deactivate the first BWP, so that it may be ensured that data may be received and/or sent on the first BWP in a process from BWP switching to reception of the message sent on the second BWP by the base station, the problem that a high-priority service may not be processed on the new second BWP after switching due to the fact that there is no resource required by processing of the high-priority service on the new second BWP after switching is solved, and UE may normally process the high-priority service when performing the BWP switching or after performing the BWP switching.

Figure 10:
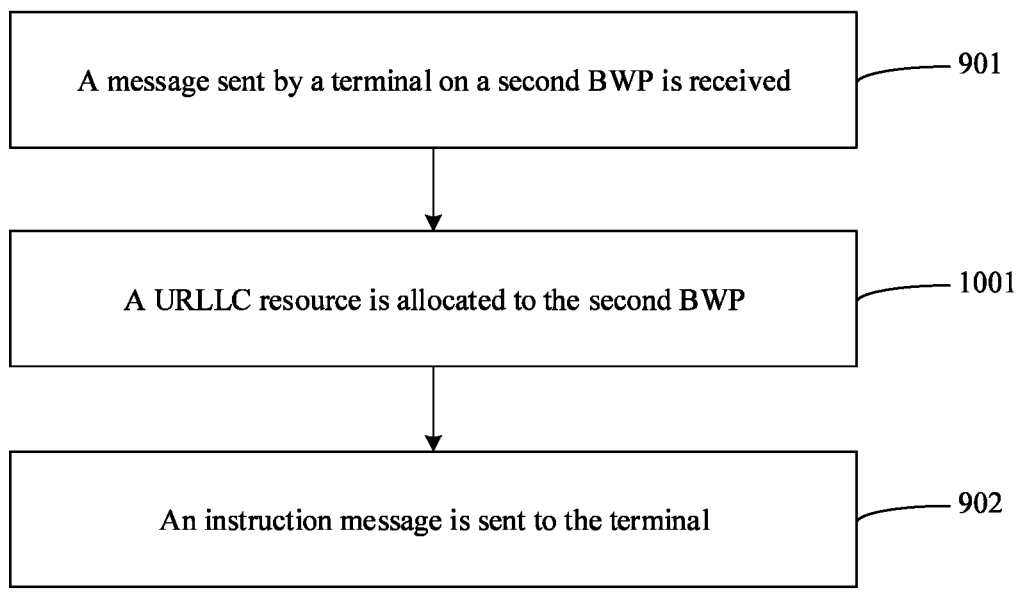
FIG. 10 is a flow chart showing a BWP switching method, according to an exemplary embodiment.

In an implementable mode, after the base station receives the message sent by the terminal on the second BWP, the base station recognizes the terminal on the second BWP, and for enabling the terminal to process a high-priority service such as URLLC on the second BWP, the base station may pre-allocate a URLLC resource to the second BWP in a pre-scheduling manner. Based on this, in an implementable mode, based on the method illustrated in FIG. 9, the BWP switching method may further include step 1001, as illustrated in FIG. 10. In step 1001, after the message sent by the terminal on the second BWP is received, a URLLC resource is allocated to the second BWP. Therefore, it may be ensured that there is the URLLC resource on the second BWP after the terminal is switched from the first BWP to the second BWP, and the terminal may process the URLLC service by use of the resource to ensure normal execution of the URLLC service.

In an implementable mode, the instruction message may include at least one of: an instruction message configured to instruct the terminal to activate the second BWP, an instruction message configured to instruct the terminal to control the first BWP to be in the inactive state, an instruction message configured to instruct the terminal to be switched from the present second BWP to a third BWP on the carrier, or an instruction message including an RRC reconfiguration. These instruction messages may be sent to the terminal by the base station, and the terminal, after receiving these messages, may deactivate the first BWP.

In an implementable mode, when the terminal initiates contention-based random access, since a PRACH resource for random access may be independently configured on each BWP, the condition that there is no PRACH resource on a presently activated BWP in an SpCell may exist, and in such case, the terminal needs to be switched to an initial BWP in the SpCell for random access. Based on this, when the terminal needs to perform the BWP switching because the terminal triggers random access and there is no random access resource on the presently activated BWP in the SpCell, the first BWP is the presently activated BWP in the SpCell, and the second BWP is the initial BWP in the SpCell.

Figure 11:
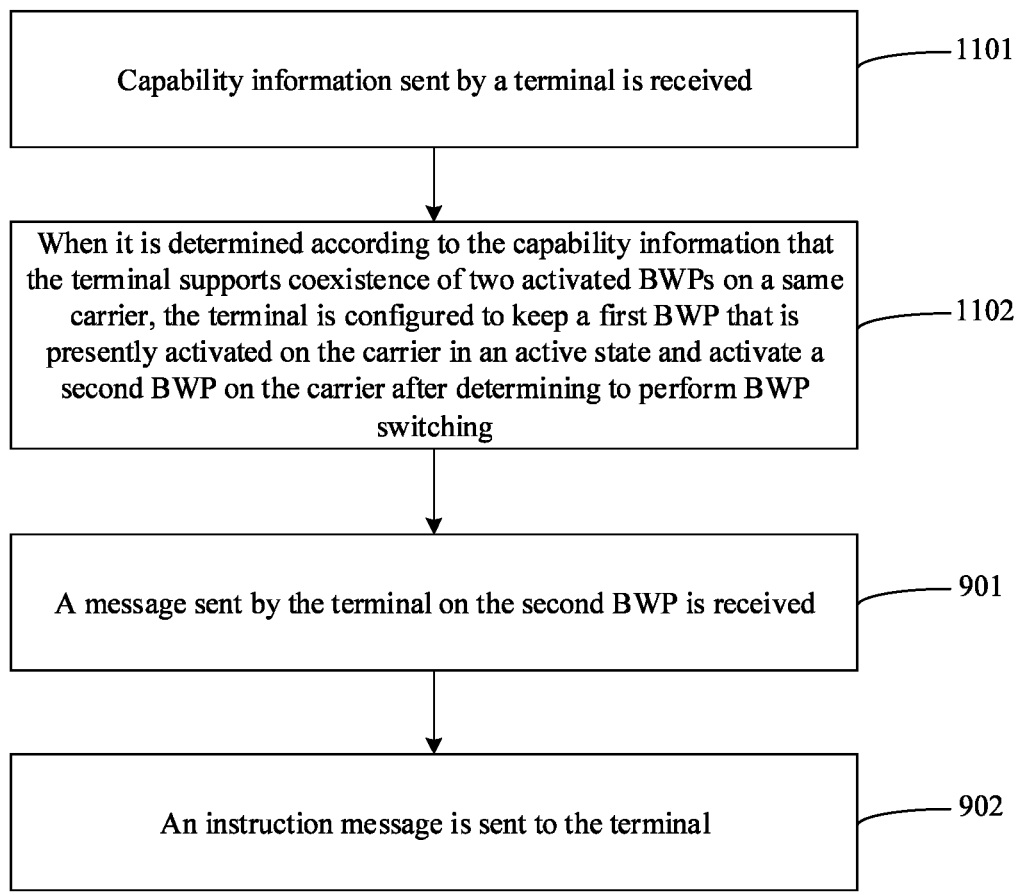
FIG. 11 is a flow chart showing a BWP switching method, according to an exemplary embodiment.

FIG. 11 is a flow chart showing a BWP switching method, according to an exemplary embodiment. As illustrated in FIG. 11, based on the method illustrated in FIG. 9, the method may further include the following steps. In step 1101, capability information sent by the terminal is received. In step 1102, when it is determined according to the capability information that the terminal supports coexistence of two activated BWPs on a same carrier, the terminal is configured to keep the first BWP that is presently activated on the carrier in an active state and activate the second BWP on the carrier after determining to perform the BWP switching. The capability information of the terminal may include that the terminal supports coexistence of two activated BWPs on the same carrier or the terminal does not support coexistence of two activated BWPs on the same carrier. Based on step 1101 and step 1102, the base station may configure the terminal according to a practical condition thereof.

Figure 12:
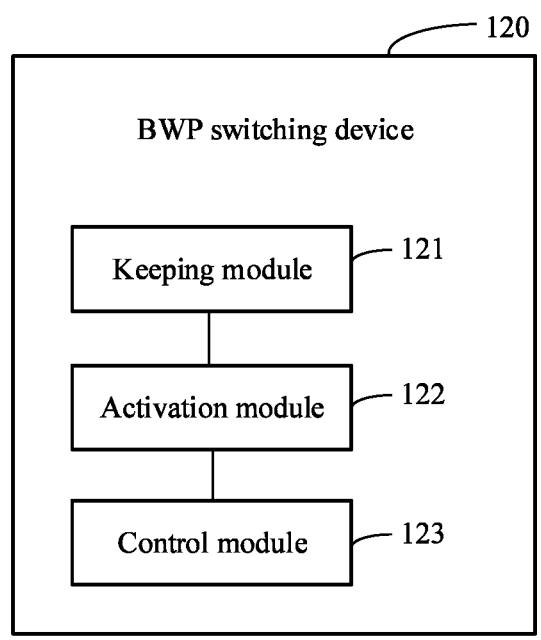
FIG. 12 is a block diagram of a BWP switching device, according to an exemplary embodiment.

FIG. 12 is a block diagram of a BWP switching device, according to an exemplary embodiment. The device is applied to a terminal. As illustrated in FIG. 12, the device 120 includes the following components: a keeping module 121, configured to, after determining that the terminal needs to perform BWP switching, keep a first BWP that is presently activated on a carrier in an active state; an activation module 122, configured to activate a second BWP on the carrier; and a control module 123, configured to control the first BWP to be in an inactive state.

Figure 13:
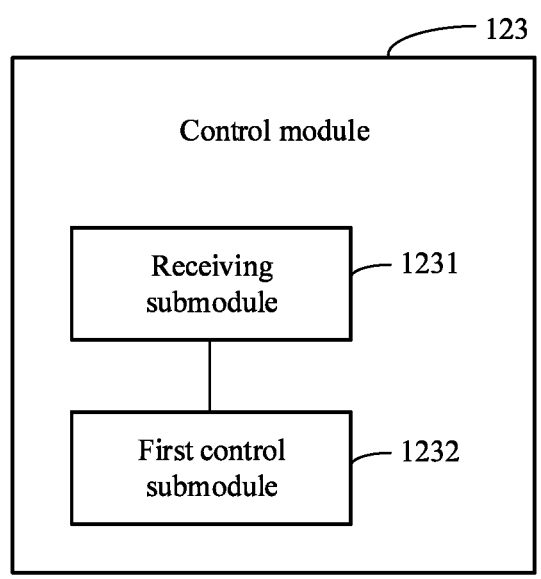
FIG. 13 is a block diagram of a control module in a BWP switching device, according to an exemplary embodiment.

FIG. 13 is a block diagram of a BWP switching device, according to an exemplary embodiment. As illustrated in FIG. 13, the control module 123 may include: a receiving submodule 1231, configured to, after the second BWP is activated, receive an instruction message sent by a base station; and a first control submodule 1232, configured to control the first BWP to be in the inactive state according to the instruction message.

In an implementable mode, the instruction message includes at least one of: an instruction message configured to instruct the terminal to activate the second BWP, an instruction message configured to instruct the terminal to control the first BWP to be in the inactive state, an instruction message configured to instruct the terminal to be switched from the second BWP to a third BWP on the carrier, or an instruction message including an RRC reconfiguration.

Figure 14:
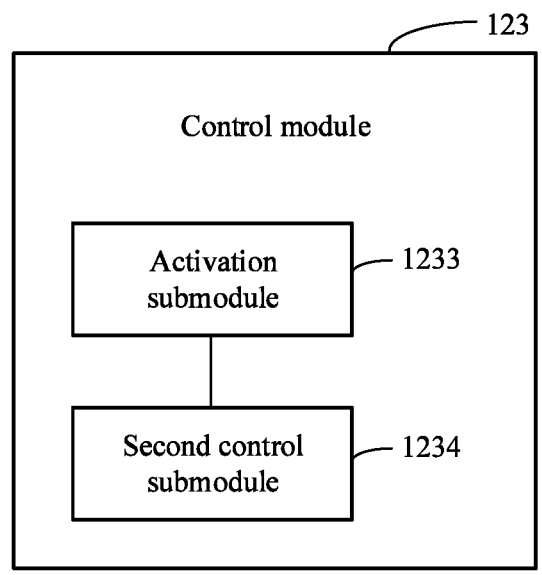
FIG. 14 is a block diagram of a control module in a BWP switching device, according to an exemplary embodiment.

In an implementable mode, the instruction message may be configured to instruct the terminal to be switched from the second BWP to the third BWP on the carrier. FIG. 14 is a block diagram of a control module in a BWP switching device, according to an exemplary embodiment. As illustrated in FIG. 14, the control module 123 may include: an activation submodule 1233, configured to activate the third BWP; and a second control submodule 1234, configured to control the first BWP and the second BWP to be in the inactive state.

In an implementable mode, the control module 123 may be configured to, when a duration of the second BWP in the active state reaches a preset duration, control the first BWP to be in the inactive state. Further, in an implementable mode, the control module 123 may be configured to, when PDCCH scheduling information for the terminal is received on the second BWP, control the first BWP to be in the inactive state.

Figure 15:
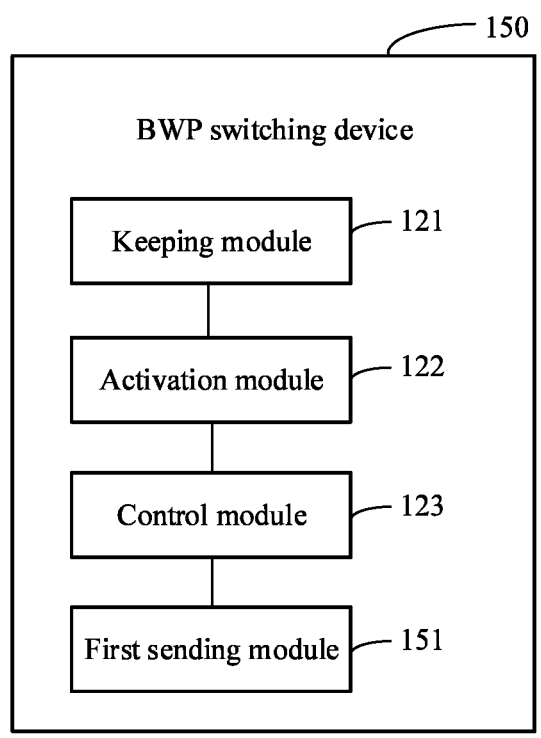
FIG. 15 is a block diagram of a BWP switching device, according to an exemplary embodiment.

FIG. 15 is a block diagram of a BWP switching device, according to an exemplary embodiment. As illustrated in FIG. 15, based on the device 120 illustrated in FIG. 12, the device 150 may further include a first sending module 151, configured to, when both the first BWP and the second BWP are in the active state and the terminal is not capable of sending messages simultaneously on the first BWP and the second BWP, according to preset priorities of the messages to be sent on the first BWP and the second BWP, select the message on one BWP in the first BWP and the second BWP to be preferentially sent and delay the message on another BWP to be sent, or according to the preset priorities of the messages to be sent on the first BWP and the second BWP, select the message on one BWP to be sent and stop sending the message on another BWP.

Figure 16:
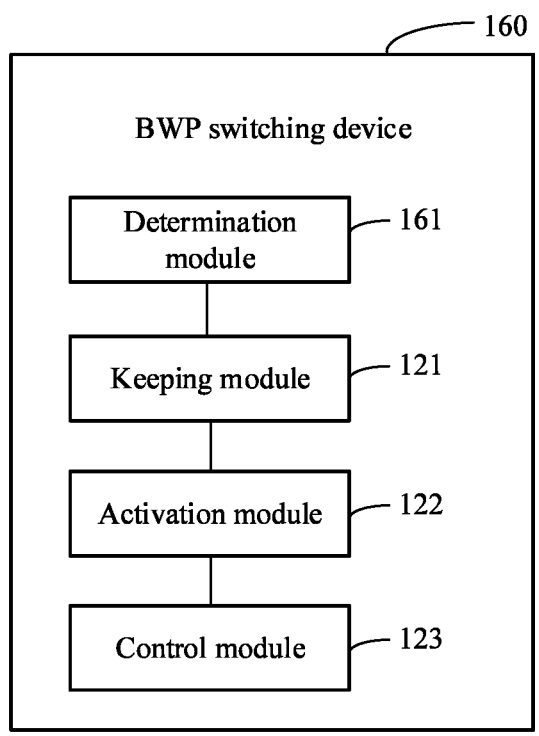
FIG. 16 is a block diagram of a BWP switching device, according to an exemplary embodiment.

FIG. 16 is a block diagram of a BWP switching device, according to an exemplary embodiment. As illustrated in FIG. 16, based on the device 120 illustrated in FIG. 12, the device 160 may further include a determination module 161, configured to, before the first BWP that is presently activated on the carrier is kept in the active state, when the terminal triggers random access and there is no random access resource on a presently activated BWP in an SpCell or an SR is to be sent by the terminal and there is no resource for sending the SR on a presently activated BWP on the carrier, determine that the terminal needs to perform the BWP switching.

In an implementable mode, when the terminal needs to perform the BWP switching because the terminal triggers random access and there is no random access resource on the presently activated BWP in the SpCell, the first BWP is the presently activated BWP in the SpCell, and the second BWP is an initial BWP in the SpCell.

Figure 17:
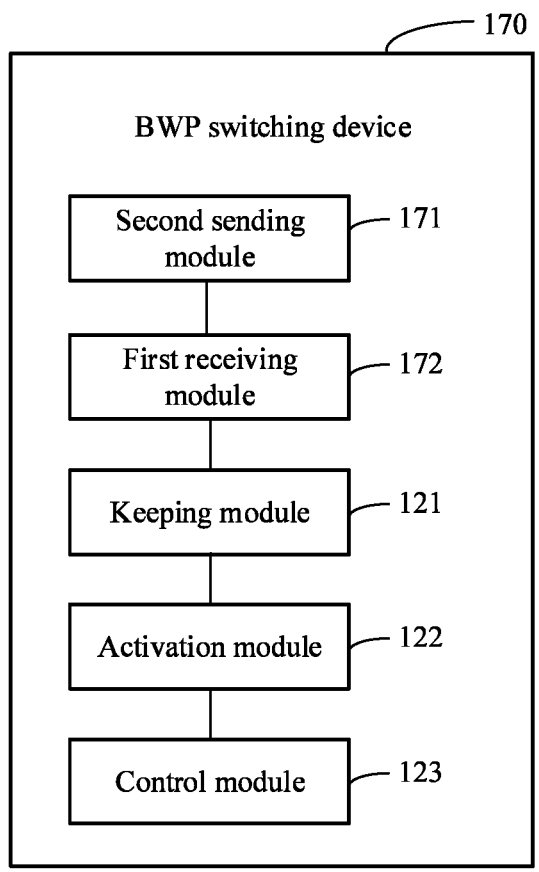
FIG. 17 is a block diagram of a BWP switching device, according to an exemplary embodiment.

FIG. 17 is a block diagram of a BWP switching device, according to an exemplary embodiment. As illustrated in FIG. 17, based on the device 120 illustrated in FIG. 12, the device 170 may further include: a second sending module 171, configured to send capability information to the base station, the capability information being configured to indicate that the terminal supports coexistence of two activated BWPs on a same carrier; and a first receiving module 172, configured to receive configuration information of the base station, the configuration information being configured to configure the terminal to keep the first BWP that is presently activated on the carrier in the active state and activate the second BWP on the carrier after determining to perform BWP switching.

Figure 18:
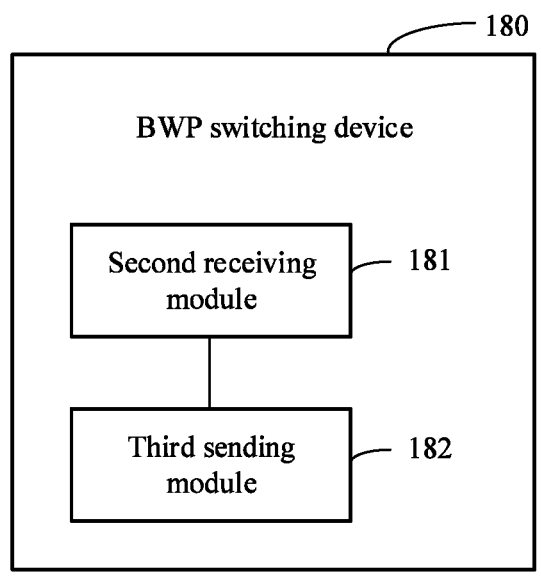
FIG. 18 is a block diagram of a BWP switching device, according to an exemplary embodiment.

FIG. 18 is a block diagram of a BWP switching device, according to an exemplary embodiment. The device is applied to a base station. As illustrated in FIG. 18, the device 180 includes: a second receiving module 181, configured to receive a message sent by a terminal on a second BWP, the second BWP being a BWP, activated when the terminal performs BWP switching, on a carrier; and a third sending module 182, configured to send an instruction message to the terminal, the instruction message being configured to instruct the terminal to control a first BWP to be in an inactive state. The first BWP may be a BWP, activated before the terminal performs the BWP switching, on the carrier.

Figure 19:
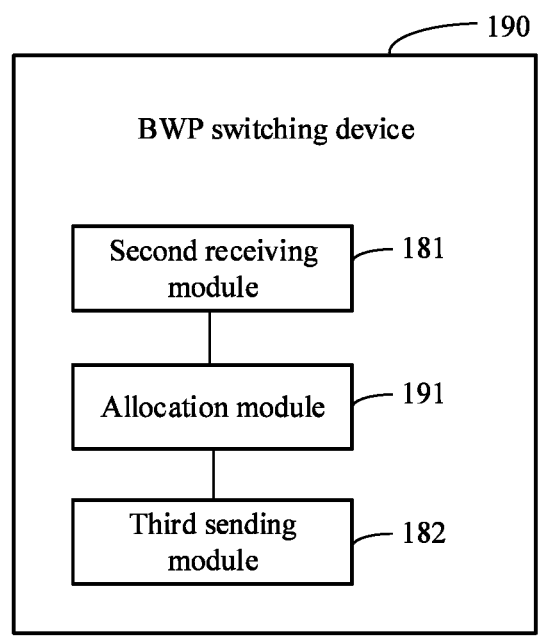
FIG. 19 is a block diagram of a BWP switching device, according to an exemplary embodiment.

FIG. 19 is a block diagram of a BWP switching device, according to an exemplary embodiment. As illustrated in FIG. 19, based on the device 180 illustrated in FIG. 18, the device 190 may further include an allocation module 191, configured to, after the message sent by the terminal on the second BWP is received, allocate a URLLC resource to the second BWP.

In an implementable mode, the instruction message may include at least one of: an instruction message configured to instruct the terminal to activate the second BWP, an instruction message configured to instruct the terminal to control the first BWP to be in the inactive state, an instruction message configured to instruct the terminal to be switched from the present second BWP to a third BWP on the carrier, or an instruction message including an RRC reconfiguration. Further, in an implementable mode, the second BWP may be an initial BWP in an SpCell.

Figure 20:
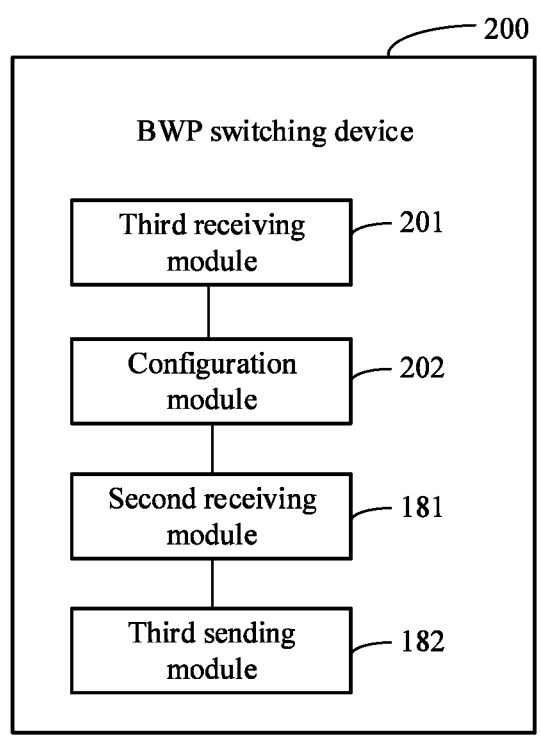
FIG. 20 is a block diagram of a BWP switching device, according to an exemplary embodiment.

FIG. 20 is a block diagram of a BWP switching device, according to an exemplary embodiment. As illustrated in FIG. 20, based on the device 180 illustrated in FIG. 18, the device 200 may further include: a third receiving module 201, configured to receive capability information sent by the terminal; and a configuration module 202, configured to, when it is determined according to the capability information that the terminal supports coexistence of two activated BWPs on a same carrier, configure the terminal to keep the first BWP that is presently activated on the carrier in an active state and activate the second BWP on the carrier after determining to perform the BWP switching.

With respect to the device in the above embodiment, the specific manners for performing operations for individual modules therein have been described in detail in the embodiments regarding the method, which will not be repeated herein.

Figure 21:
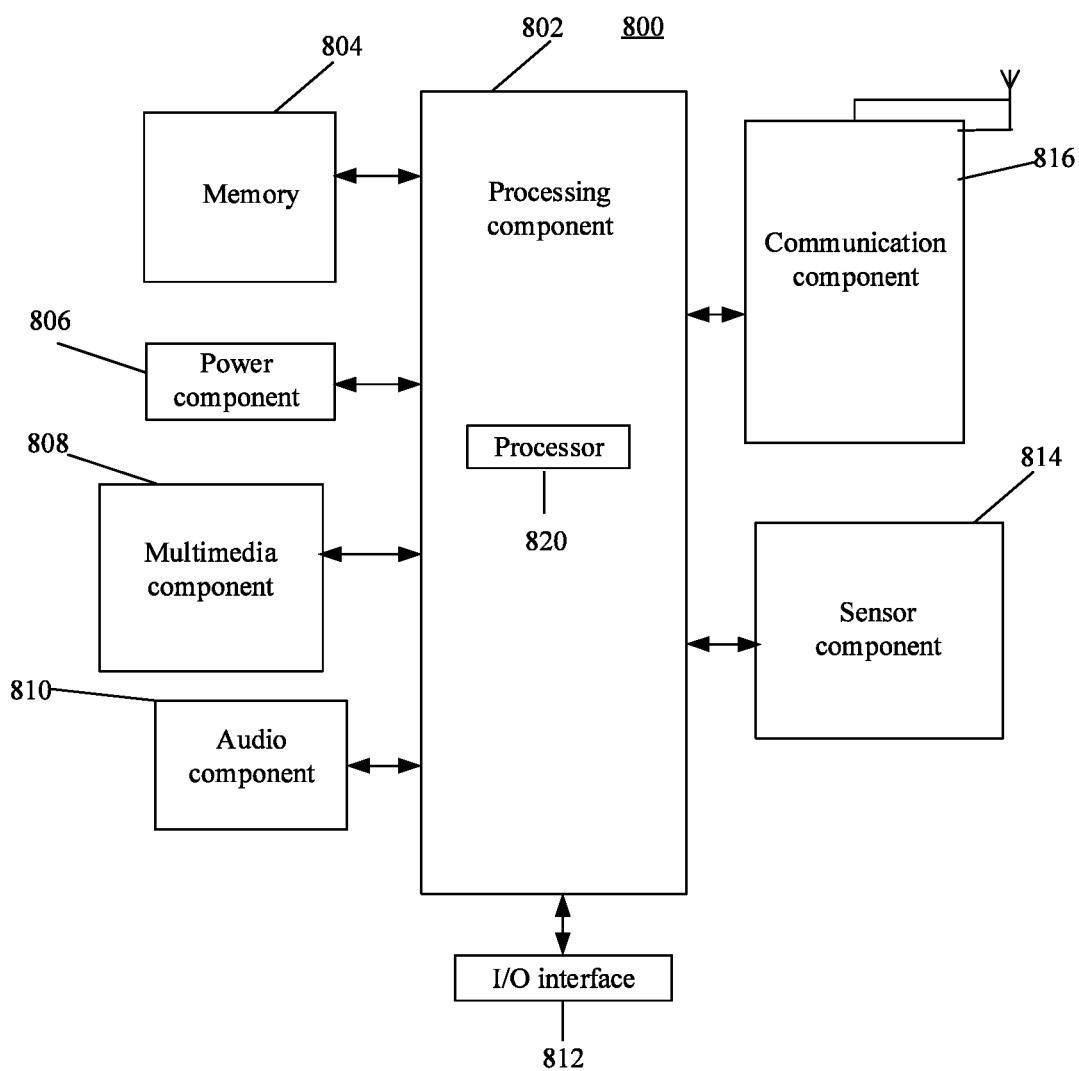
FIG. 21 is a block diagram of a BWP switching device, according to an exemplary embodiment.

FIG. 21 is a block diagram of a BWP switching device 800, according to an exemplary embodiment. For example, the device 800 may be a mobile phone, a computer, a digital broadcast terminal, a messaging device, a gaming console, a tablet, a medical device, exercise equipment, a personal digital assistant, and the like.

Referring to FIG. 21, the device 800 may include one or more of the following components: a processing component 802, a memory 804, a power component 806, a multimedia component 808, an audio component 810, an input/output (I/O) interface 812, a sensor component 814, or a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and other components. For instance, the processing component 802 may include a multimedia module to facilitate interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, and the like. The memory 804 may be implemented by any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power for various components of the device 800. The power component 806 may include a power management system, one or more power supplies, and other components associated with generation, management and distribution of power for the device 800.

The multimedia component 808 includes a screen providing an output interface between the device 800 and a user. In some embodiments, the screen may include a liquid crystal display (LCD) and a touch panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action, but also detect a period of time and a pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a microphone (MIC), and the MIC is configured to receive an external audio signal when the device 800 is in an operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and peripheral interface modules, such as a keyboard, a click wheel, buttons and the like. The buttons may include, but are not limited to: a home button, a volume button, a starting button and a locking button.

The sensor component 814 includes one or more sensors configured to provide status assessments in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and other devices. The device 800 may access any communication-standard-based wireless network, such as a Wi-Fi network, a 2nd-generation (2G) or 3rd-generation (3G) network or a combination thereof. In an exemplary embodiment, the communication component 816 receives a broadcast signal or broadcast associated information from an external broadcast management system through a broadcast channel. In an exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an exemplary embodiment, the device 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned method.

In an exemplary embodiment, there is also provided a non-transitory computer-readable storage medium including instructions, such as included in the memory 804, executable by the processor 820 of the device 800 for performing the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

Figure 22:
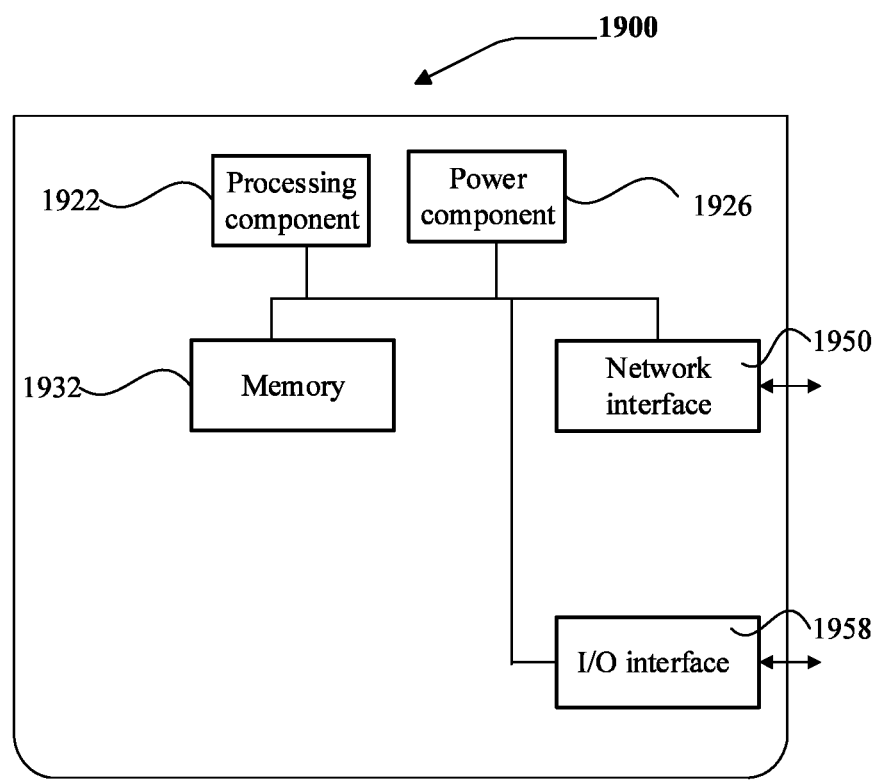
FIG. 22 is a block diagram of a BWP switching device, according to an exemplary embodiment.

FIG. 22 is a block diagram of a BWP switching device 1900, according to an exemplary embodiment. For example, the device 1900 may be provided as a server. Referring to FIG. 19, the device 1900 includes a processing component 1922, further including one or more processors, and a memory resource represented by a memory 1932, configured to store instructions executable by the processing component 1922, for example, an application program. The application program stored in the memory 1932 may include one or more than one module of which each corresponds to a set of instructions. In addition, the processing component 1922 is configured to execute the instructions to execute the BWP switching method.

The device 1900 may further include a power component 1926 configured to execute power management of the device 1900, a wired or wireless network interface 1950 configured to connect the device 1900 to a network and an I/O interface 1958. The device 1900 may be operated based on an operating system stored in the memory 1932, for example, Windows Server™, Max OS X™, Unix™, Linux™, FreeBSD™ or the like.

In an exemplary embodiment, there is also provided a non-transitory computer-readable storage medium including instructions, such as included in the memory 1932, executable by the processing component 1922 of the device 1900 for performing the abovementioned methods. For example, the non-transitory computer-readable storage medium may be a ROM, a RAM, a CD-ROM, a magnetic tape, a floppy disc, an optical data storage device, and the like.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A bandwidth part (BWP) switching method, which is performed by a terminal, the method comprising:
determining that the terminal needs to perform the BWP switching;
wherein the terminal triggers random access and there is no random access resource on a presently activated BWP in a special cell (SpCell); or
a scheduling request (SR) is to be sent by the terminal and there is no resource for sending the SR on a presently activated BWP on a carrier,
keeping a first BWP that is presently activated on the carrier in an active state after determining that the terminal needs to perform the BWP switching;
activating a second BWP on the carrier;
sending a message to a base station on the second BWP;
receiving an instruction message sent by the base station; and
controlling the first BWP to be in the inactive state according to the instruction message,
wherein each one of the first BWP and the second BWP is used to receive and send data.

2. A bandwidth part (BWP) switching method performed by a base station, the method comprising:
receiving a message sent by a terminal on a second BWP that is a BWP that is activated responsive to the terminal determines that the terminal needs to perform BWP switching;
wherein the terminal determines that the terminal needs to perform the BWP switching responsive to that the terminal triggers random access and there is no random access resource on a presently activated BWP in a special cell (SpCell) or that a scheduling request (SR) is to be sent by the terminal and there is no resource for sending the SR on a presently activated BWP on a carrier, wherein the presently activated BWP is a first BWP; and
sending an instruction message to the terminal, the instruction message being configured to instruct the terminal to control the first BWP to be in an inactive state, wherein the first BWP is a BWP that is activated before the terminal performs the BWP switching on the carrier,
wherein each one of the first BWP and the second BWP is used to receive and send data.

3. The method of claim 2, further comprising:
allocating an ultra reliable & low latency communication (URLLC) resource to the second BWP after the message sent by the terminal on the second BWP is received.

4. The method of claim 2, wherein the instruction message includes at least one of an instruction message that:
is configured to instruct the terminal to be switched from the second BWP to a third BWP on the carrier, or
includes a radio resource control (RRC) reconfiguration.

5. The method of claim 2, wherein the second BWP is an initial BWP in the SpCell.

6. The method of claim 2, further comprising:
receiving capability information sent by the terminal; and
configuring the terminal to keep the first BWP that is presently activated on the carrier in an active state and activate the second BWP on the carrier after determining to perform the BWP switching when it is determined that the terminal supports coexistence of two activated BWPs on a same carrier based on the capability information.

7. A base station implementing operations of the BWP switching method of claim 2, the base station comprising:
a processor; and
a memory that is configured to store instructions executable by the processor;
wherein the processor is configured to:
receive the message sent by the terminal on the second BWP, the second BWP being the BWP that is activated responsive to that the terminal determines that the terminal needs to performs the BWP switching;
wherein the terminal determines that the terminal needs to perform the BWP switching responsive to that the terminal triggers random access and there is no random access resource on the presently activated BWP in the SpCell or that the SR is to be sent by the terminal and there is no resource for sending the SR on the presently activated BWP on the carrier; and
send the instruction message to the terminal, the instruction message being configured to instruct the terminal to control the first BWP to be in the inactive state, wherein the first BWP is the BWP that is activated before the terminal performs the BWP switching on the carrier;
wherein each one of the first BWP and the second BWP is used to receive and send data.

8. The base station of claim 7, wherein the processor is further configured to:
allocate an ultra reliable & low latency communication (URLLC) resource to the second BWP after the message sent by the terminal on the second BWP is received.

9. The base station of claim 7, wherein the instruction message includes at least one of an instruction message that:
is configured to instruct the terminal to be switched from the present second BWP to a third BWP on the carrier, or
includes a radio resource control (RRC) reconfiguration.

10. The base station of claim 7, wherein the second BWP is an initial BWP in the SpCell.

11. The base station of claim 7, wherein the processor is further configured to:
receive capability information sent by the terminal; and
configure the terminal to keep the first BWP that is presently activated on the carrier in an active state and activate the second BWP on the carrier after determining to perform the BWP switching when it is determined that the terminal supports coexistence of two activated BWPs on a same carrier based on the capability information.

12. A terminal, comprising:
a processor; and
a memory that is configured to store instructions executable by the processor;
wherein the processor is configured to:
determine that the terminal needs to perform bandwidth part (BWP) switching;
wherein the terminal triggers random access and there is no random access resource on a presently activated BWP in a special cell (SpCell); or
a scheduling request (SR) is to be sent by the terminal and there is no resource for sending the SR on a presently activated BWP on a carrier;

keep a first BWP that is presently activated on the carrier in an active state after determining that the UE needs to perform the BWP switching;
activate a second BWP on the carrier;
send a message to a base station on the second BWP;
receive an instruction message sent by the base station; and
control the first BWP to be in the inactive state according to the instruction message,
wherein each one of the first BWP and the second BWP is used to receive and send data.

* * * * *